(12) United States Patent
Kim et al.

(10) Patent No.: US 10,111,120 B2
(45) Date of Patent: Oct. 23, 2018

(54) APPARATUS AND METHOD FOR DIAGNOSING ANOMALY IN MOBILE COMMUNICATION NETWORK

(71) Applicant: Korea Advanced Institute of Science and Technology, Daejeon (KR)

(72) Inventors: Yongdae Kim, Daejeon (KR); Byeong Do Hong, Daejeon (KR); Sung-Ju Lee, Daejeon (KR); Shinjo Park, Daejeon (KR); Hongil Kim, Daejeon (KR); HyunWook Hong, Daejeon (KR); Dongkwan Kim, Daejeon (KR); Hyunwoo Choi, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 15/432,552

(22) Filed: Feb. 14, 2017

(65) Prior Publication Data

US 2018/0199219 A1     Jul. 12, 2018

(30) Foreign Application Priority Data

Jan. 9, 2017    (KR) .................. 10-2017-0002925

(51) Int. Cl.
     *H04B 17/00*      (2015.01)
     *H04W 24/08*      (2009.01)
     *H04L 12/26*      (2006.01)

(52) U.S. Cl.
     CPC ......... *H04W 24/08* (2013.01); *H04L 43/0823* (2013.01)

(58) Field of Classification Search
     CPC .... H04W 24/08; H04W 92/18; H04B 17/309; H04B 17/336; H04B 17/345;
(Continued)

(56) References Cited

U.S. PATENT DOCUMENTS

| | | | | |
|---|---|---|---|---|
| 5,285,200 A * | 2/1994 | Kuriyama | ............ | G06Q 20/341 235/380 |
| 5,737,481 A * | 4/1998 | Gushima | .............. | G11B 19/042 386/235 |

(Continued)

FOREIGN PATENT DOCUMENTS

| KR | 1007868210000 B1 | 12/2007 |
|---|---|---|
| KR | 1020140061209 A | 5/2014 |
| KR | 1020140077127 A | 6/2014 |

*Primary Examiner* — Golam Sorowar
*Assistant Examiner* — Max Mathew
(74) *Attorney, Agent, or Firm* — EIP US LLP (57) ABSTRACT

A network anomaly diagnosis device and a method thereof are provided. The network anomaly diagnosis device includes a data analyzer configured to receive a control plane message for a service provided to a terminal by a mobile network operator (MNO) from the terminal and analyze the control plane message, a database configured to collect results of analyzing control plane messages for services provided to the terminal by different MNOs including the MNO from the data analyzer and store the result of analyzing the control plane message for each MNO, and a controller configured to compare the result of analyzing the control plane message of the MNO at the data analyzer with the result of analyzing the control plane message for each MNO, the result being stored in the database.

3 Claims, 4 Drawing Sheets

(58) Field of Classification Search
CPC .......... H04B 1/1027; H04B 2001/1045; H04B 17/0085; H04B 17/16; H04B 17/18; H04B 17/19; H04B 17/21; H04L 1/0026; H04L 43/08; H04L 43/50; H04L 63/1408; H04L 1/20
USPC .................. 455/424, 410, 423, 426.1; 726/4
See application file for complete search history.

(56) References Cited

U.S. PATENT DOCUMENTS

| | | | | |
|---|---|---|---|---|
| 8,630,197 B2* | 1/2014 | Chu | ...................... | H04W 28/06 370/252 |
| 2002/0065043 A1* | 5/2002 | Hamada | ................ | H04W 28/06 455/41.3 |
| 2005/0053037 A1* | 3/2005 | Ginzburg | .............. | H04L 1/0002 370/333 |
| 2006/0109814 A1* | 5/2006 | Kuzminskiy | ........ | H04B 7/0408 370/329 |
| 2008/0037482 A1* | 2/2008 | Douglas | .................. | H04L 43/08 370/338 |
| 2010/0134336 A1* | 6/2010 | Sung | ................... | H03H 17/0685 341/144 |
| 2010/0309831 A1* | 12/2010 | Yeh | .................... | H04W 52/0216 370/311 |
| 2011/0032832 A1* | 2/2011 | Jalali | ....................... | H04L 47/10 370/252 |
| 2012/0039391 A1* | 2/2012 | Frusina | ................... | H04L 47/25 375/240.07 |
| 2012/0129517 A1* | 5/2012 | Fox | ...................... | H04L 41/5025 455/425 |
| 2014/0273950 A1* | 9/2014 | Li | .......................... | G06F 3/0481 455/410 |
| 2015/0065121 A1* | 3/2015 | Gupta | ................... | H04W 24/08 455/424 |
| 2015/0071334 A1* | 3/2015 | Chini | ...................... | H04B 1/10 375/219 |
| 2015/0312855 A1* | 10/2015 | Razaghi | ............ | H04W 52/0216 370/311 |
| 2016/0198515 A1* | 7/2016 | Lee | ....................... | H04W 76/18 455/423 |
| 2016/0342672 A1* | 11/2016 | Fukui | ................ | G06F 17/30575 |
| 2017/0251385 A1* | 8/2017 | Fox | ....................... | H04W 24/02 |

* cited by examiner

APPARATUS AND METHOD FOR DIAGNOSING ANOMALY IN MOBILE COMMUNICATION NETWORK

CROSS-REFERENCE TO RELATED APPLICATIONS

A claim for priority under 35 U.S.C. § 119 is made to Korean Patent Application No. 10-2017-0002925, filed Jan. 9, 2017, in the Korean Intellectual Property Office, the entire contents of which are hereby incorporated by reference.

BACKGROUND OF THE INVENTION

Field of the Invention

Embodiments of the inventive concepts described herein relate to an apparatus and method for diagnosing whether an anomaly occurs in a network.

Description of the Related Technology

Contents described by this part simply provide background information about an embodiment and do not configure the related art.

Each mobile network operator (MNO) measures whether an anomaly occurs in a network, particularly, whether an anomaly occurs on a control plane on a network by actually connecting a measuring instrument for communication to a terminal for communication. Each MNO collects a large amount of control plane messages by directly connect the terminal with the measuring instrument for communication. Each MNO measures an anomaly in a service (e.g., a data communication service, a voice communication service, a positioning service, or the like) of collecting control plane messages and providing the collected control plane messages to the terminal and verifies and ascertains the anomaly situation in a core network. Diagnosis of anomalies on the control plane in this way is achieved through simple statistics values or notable direct problem searches.

However, it is difficult for a conventional method of diagnosing anomalies on the control plane in an MNO to discover unnoticeable problem phenomena and also ascertain the cause. The diagnosis of anomalies in this way may cause unexpected other problems hereafter. For example, although measured anomalies are addressed when a manager omits an unimportant simple procedure, the omitting of this procedure may have an influence on another service.

There is a need for diagnosing fundamental anomalies through an accurate cause analysis to avoid this situation. The situation of generated anomalies should be ascertained by comparing messages of an access network and a core network using standards to accurately ascertain anomalies. However, there are very vast amounts of standards configuring each plane of mobile communication, and each MNO implements a network through its own scheme with respect to portions designated as options in standards. Therefore, it is difficult to ascertain causes of anomalies on a network although standards are analyzed. Thus, there is a need for an apparatus and method for simply and easily analyzing a cause of an anomaly.

SUMMARY

Embodiments of the inventive concepts provide a network anomaly diagnosis device for comparing and analyzing detailed procedures in control plane messages of a plurality of mobile network operators (MNOs) or statistics for each detailed procedure to diagnose a cause where an anomaly occur.

According to an aspect of an embodiment, a network anomaly diagnosis device may include a data analyzer configured to receive a control plane message for a service provided to a terminal by a mobile network operator (MNO) from the terminal and analyze the control plane message, a database configured to collect results of analyzing control plane messages for services provided to the terminal by different MNOs including the MNO from the data analyzer and store the result of analyzing the control plane message for each MNO, and a controller configured to compare the result of analyzing the control plane message of the MNO at the data analyzer with the result of analyzing the control plane message for each MNO, the result being stored in the database.

BRIEF DESCRIPTION OF THE DRAWINGS

The above and other objects and features will become apparent from the following description with reference to the following figures, wherein like reference numerals refer to like parts throughout the various figures unless otherwise specified, and wherein.

DETAILED DESCRIPTION OF CERTAIN INVENTIVE EMBODIMENTS

Hereinafter, a detailed description will be given of some embodiments of the inventive concept with reference to the exemplary drawings. In adding reference denotations to elements of each drawing, it should be noted that the same denotations refer to the same elements through the accompanying drawings although they are displayed on different drawings. Further, in describing the inventive concept, if it is determined that a detailed description of related well-known functions or configurations may blurs the gist of the inventive concept, the detailed description will be omitted.

Further, in describing elements of the inventive concept, the terms "first", "second, "A"", "B", "(a)", "(b)", and the like may be used herein. Such terms are only for the purpose of distinguishing the element from another element and are not limited to attributes, a turn, an order, or the like of the corresponding element. Throughout the specification, when any portion "includes" and "has" any element, unless explicitly described to the contrary, it is meant that this implies the inclusion of other elements but not the exclusion of any other elements. Further, the terms "unit", "module", and the like described in the specification may refer to the unit of processing at least one function or operation and may be implemented with hardware, software, or a combination thereof.

Figure 1:
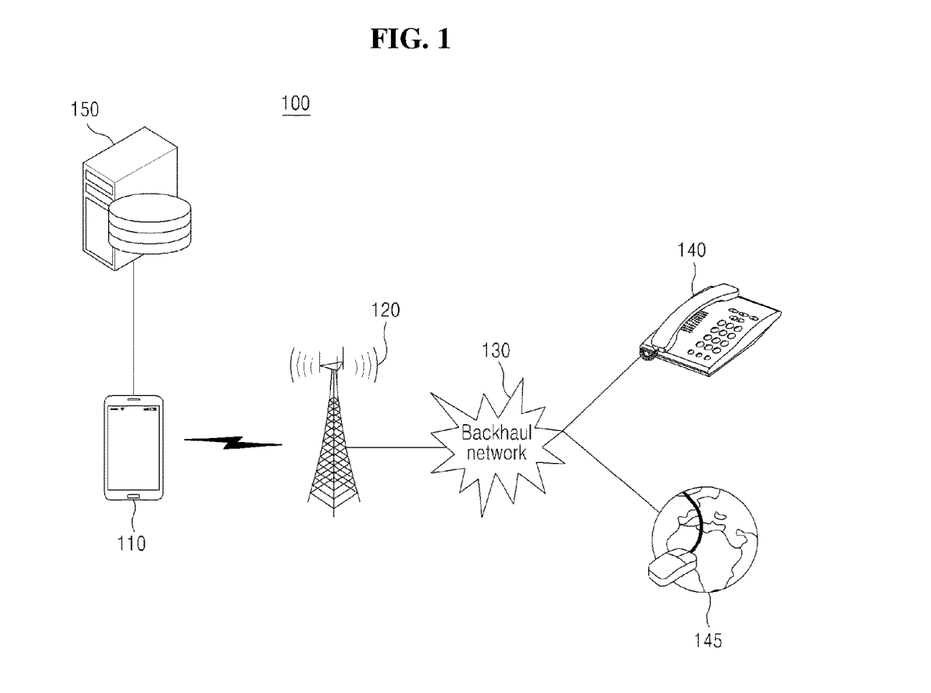
FIG. 1 is a drawing illustrating a configuration of a network anomaly diagnosis system according to an embodiment.

FIG. 1 is a drawing illustrating a configuration of a network anomaly diagnosis system according to an embodiment.

Referring to FIG. 1, a network anomaly diagnosis system according to an embodiment may include a terminal 110, a base station 120, a backhaul network 130, a telephone network 140, an internet network 145, and an anomaly diagnosis device 150.

The terminal 110 may be a device which connects with the telephone network 140 or the internet network 145 via the base station 120 and the backhaul network 130 and uses a voice call or a wireless network. The terminal 110 may include all smart devices, such as a smartphone, a tablet personal computer (PC), and a smart watch, which may use the voice call or the wireless network. The terminal 110 may be the concept of including a notebook, a laptop, a personal digital assistant (PDA), and the like other than the smart devices. The terminal 110 may use the voice all or the wireless network by establishing a session with the telephone network 140 or the internet network 145 via the base station 120 and the backhaul network 130 and transmitting and receiving voice information or data with another device (e.g., a portal server, another terminal, or the like).

The terminal 110 may use the voice call or the wireless network and may receive a control plane message on various services (e.g., mobility management, terminal authentication, a call service, or radio resource control, and the like). The terminal 110 may receive control plane messages on various services from a mobile network operator (MNO) which provides the voice call or operates the wireless network and may operate or determine based on the received control plane messages. Next, the terminal 110 may transmit the operated or determined result according to the control plane messages to the telephone network 140 or the internet network 145, thus allowing the MNO to verify the operated or determined result of the terminal 110 according to the transmission of the corresponding control plane messages.

The base station 120 may be present between the terminal 110 and the backhaul network 130 and may transmit voice information or data between the terminal 110 and the telephone network 140 or the internet network 145. If a network is implemented with third generation (3G) mobile communication, the base station 120 may be implemented as a Node B (NodeB). If a network is implemented with 4G long term evolution (LTE) mobile communication, the base station 120 may be implemented as an evolved Node B (eNodeB).

The backhaul network 130 may connect the base station 120 with the telephone network 140 or the internet network 145 to transmit and receive data or a control plane message. The backhaul network 130 may include a variety of components based on a form of implementing a network. For example, if the network is implemented with 3G mobile communication, the backhaul network 130 may include components such as a mobile switching center (MSC) (not shown), a serving general packet radio service (GPRS) support node (SGSN) (not shown), and a gateway GPRS support node (GGSN) (not shown). The backhaul network 130 may transmit and receive data of a data plane and a message of a control plane, such as voice information or wireless network data, between the MNO and the terminal 110 via the telephone network 140 and the internet network 145. Meanwhile, if the network is implemented with 4G LTE mobile communication, the backhaul network 130 may include a component such as a mobility management entity (MME) (not shown), a serving gateway (S-GW) (not shown), a packet data network gateway (P-GW) (not shown), or a home subscriber server (HSS) (not shown). As described above, the backhaul network 130 may be implemented to include components to transmit and receive data or a control plane message based on a form of implementing the network. Although there is a new network (e.g., 5G mobile communication or subsequent generation mobile communication) at a later time due to development of technologies, the backhaul network 130 may be implemented to include a component of transmitting and receiving data or a control plane message in the corresponding network.

The anomaly diagnosis device 150 may be a device of receiving and analyzing the control plane message received at the terminal 110 from the terminal 110 and diagnosing whether an anomaly occurs on the network. The anomaly diagnosis device 150 may collect control plane messages provided by a plurality of MNOs with respect to various services from terminals and may store the analyzed results in advance. Thereafter, the anomaly diagnosis device 150 may receive and analyze a control plane message received at the terminal 110 from the terminal 110. The anomaly diagnosis device 150 may compare the result of receiving and analyzing a control plane message from the terminal 110 with a previously stored analyzed result and may diagnose whether an anomaly occurs on the network. A description will be given in detail of this with reference to FIGS. 2 to 4.

Figure 2:
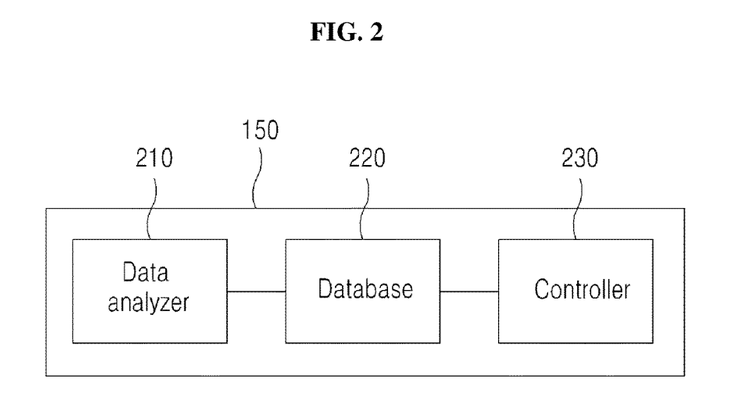
FIG. 2 is a block diagram illustrating a configuration of an anomaly diagnosis device according to an embodiment.

FIG. 2 is a block diagram illustrating a configuration of an anomaly diagnosis device according to an embodiment.

Referring to FIG. 2, an anomaly diagnosis device 150 according to an embodiment may include a data analyzer 210, a database 220, and a controller 230.

The data analyzer 210 may receive a control plane message from a terminal 110 of FIG. 1 and may analyze the received control plane message. In analyzing the control plane message, the data analyzer 210 may analyze an order of procedures included in the control plane message or a time taken for each procedure. The data analyzer 210 may analyze each of messages in a control plane. Particularly, the data analyzer 210 may analyze an order of procedures or a time taken for each of the procedures based on each of the messages in the control plane. Also, the data analyzer 210 may analyze a time taken for each procedure included in the control plane message and may ascertain whether how long it takes in any procedure.

The data analyzer 210 may receive and analyze a control plane message provided from a plurality of different MNOs as well as a predetermined MNO to the terminal 110. Before diagnosing an anomaly on a network, the data analyzer 210 may receive and analyze control plane messages provided from a plurality of different MNOs including a predetermined MNO used by the terminal 110 to the terminal 110 from terminals including the terminal 110. As such, the data analyzer 210 may determine an unnecessary procedure a specific MNO may fail to detect itself or a procedure estimated to be abnormal by receiving and analyzing control plane message provided from various MNOs.

Before diagnosing an anomaly on a network, the data analyzer 210 may receive and analyze control plane messages for various services provided by a plurality of MNOs. The data analyzer 210 may receive and analyze only a control plane message of only a specific service. Embodiments are not limited thereto. For example, the data analyzer 210 may receive and analyze the control plane messages for the various services provided from the plurality of MNOs as well as the specific service. For example, although the anomaly diagnosis device 150 determines whether an anomaly occurs on a network when the terminal 110 uses a call service, the data analyzer 210 may receive and analyze control plane messages for various services such as mobility management or radio resource control as well as the call service. The data analyzer 210 may transmit the results of analyzing the control plane messages for the various services provided by the plurality of MNOs to the database 220. As such, as the data analyzer 210 may analyze the control plane messages for the various services and may construct the database 220, although an anomaly for any service occurs later, the anomaly may be simply diagnosed.

In receiving and analyzing the control plane messages for the various services provided by the plurality of MNOs, the data analyzer 210 may repeatedly receive and analyze a control plane message for the same service a plurality of number of times. The data analyzer 210 may derive statistics of the result of analyzing the control plane message for the corresponding service by repeatedly receiving and analyzing the control plane message provided to the terminal 110, for example, 1000 times, with respect to the same service for each MNO. For example, the data analyzer 210 may receive and analyze control plane messages corresponding to 1000 calls in providing a call connection service and may derive statistics of the analyzed result, for example, may obtain an average or a middle value of a time taken for each procedure included in each of the control plane messages. To receive and analyze a plurality of control plane messages may be more common in analyzed result than to receive and analyze one control plane message for a specific service.

If the data analyzer 210 wants to diagnose an anomaly on a network, it may receive and analyze a control plane message for a specific service provided to the terminal 110 by a specific MNO from the terminal 110. As described above, in analyzing the control plane message, the data analyzer 210 may analyze an order of procedures included in the control plane message or a time taken for each procedure. The data analyzer 210 may transmit the analyzed result to the database 220 and the controller 230.

The database 220 may receive and store the result of analyzing the control plane messages for the various services provided by the plurality MNOs from the data analyzer 210. The database 220 may store the result of analyzing the control plane messages for the various services provided by the plurality of MNOs before the data analyzer 210 diagnoses an anomaly of the network for each MNO. The database 220 may store the analyzed results and may provide the stored analyzed results as a comparison group if the controller 230 wants to diagnose at a later time whether an anomaly occurs on the network. The database 220 may receive the results of analyzing the control plane messages for the various services as statistics from the data analyzer 210 and may store the statistics of the result of analyzing the control plane message for each service.

The controller 230 may receive the result of analyzing a control plane message for a specific service provided to the terminal 110 by a specific MNO at the data analyzer 210 and the result of analyzing a control plane message for a specific service for each MNO, stored in the database 220. The controller 230 may compare the analyzed result received from the data analyzer 210 with the analyzed result received from the database 220 to diagnose whether there is an anomaly on a network. A detailed description will be given hereinafter.

The controller 230 may compare a time taken for each procedure included in a control plane message for a specific service of a specific MNO, analyzed by the data analyzer 210, with a time taken for each procedure included in a control plane message for a specific service for each MNO, stored in the database 220. The controller 230 may designate the time taken for each procedure and statistics associated with the time taken, stored in the database 220, as a comparison group and may compare the comparison group with statistics of the control plane message for a service of the specific MNO, received from the data analyzer 210. As a result of the comparison, if a time taken by a specific procedure among procedures included in the control plane message for the specific service of the specific MNO, received from the data analyzer 210, is longer than a comparison group of the same or different MNO, stored in the database 220, the controller 230 may determine that an anomaly occurs in the corresponding procedure in the control plane message for the specific service. The controller 230 may obtain the following effect by comparing a time taken for each procedure included in the control plane message for the specific service of the specific MNO with a comparison group of another MNO. If it takes a long time generally and equally for a specific procedure included in the control plane message of the specific MNO, although the specific MNO verifies an anomaly of each of procedures included in the control plane message itself, it may fail to discover never whether an anomaly occurs in the corresponding procedure. However, the controller 230 in the anomaly diagnosis device 150 according to an embodiment may compare times taken for the same procedure between different MNOs as well as comparing times taken for the same procedure of the same MNOs, thus discovering an anomaly for the procedure of the MNO.

The controller 230 may compare an order of procedures included in a control plane message for a specific service of a specific MNO, analyzed by the data analyzer 210, with a comparison group for each MNO, stored in the database 220. The controller 230 may determine whether an unnecessarily performed procedure other than an essential procedure is present in the control plane message for the specific service of the specific MNO by comparing the order of the procedures with the comparison group. For example, if the control plane message for the specific service of the specific MNO additionally includes a procedure as compared with a comparison group of another MNO, the controller 230 may estimate the additionally included procedure at an unnecessarily performed procedure and may separately classify the procedure. A user of the anomaly diagnosis device 150 may determine whether each procedure estimated to be a procedure unnecessarily further performed is a substantially unnecessary procedure by verifying the procedure classified by the controller 230. The user of the anomaly diagnosis device 150 may easily verify whether an unnecessary procedure is included in a control plane message for a specific service of a specific MNO using only a simple operation of verifying the procedure classified by the controller 230.

For example, a description will be given of the above-mentioned operation of the controller 230 hereinafter. It is assumed that a control plane message of a service for updating a location is received and analyzed from a terminal. It is assumed that it takes 10 seconds to update a location of a terminal at an MNO "A" and it takes 8 seconds and 8.2 seconds respectively to update the location of the terminal at MNOs "B" and "C". The controller 230 may compare an order of procedures included in a control plane message of a location update service of the terminal at the MNO "A" or a time taken for each procedure with an order of procedures included in a control plane message of a location update service of the terminal at each of the MNOs "B" and "C" or a time taken for each procedure. If there is no difference in the orders of the procedures included in the control plane messages of the MNOs "A" to "C" for the location update service of the terminal, the controller 230 may compare the time taken for each procedure to diagnose a procedure in which an anomaly occurs. In contrast, if the order of the procedures included in the control plane message of the MNO "A" differs from the order of the procedures included in the control plane message of each of the MNOs "B" and "C" or if the number of the procedures included in the control plane message of the MNO "A" differs from the number of the procedures included in the control plane message of each of the MNOs "B" and "C", the controller 230 may compare the procedures for each MNO to ascertain an additional procedure of the MNO "A" and may estimate the ascertained procedure at an unnecessarily performed procedure, thus separately classifying the ascertained procedure. As such, the controller 230 may determine in detail whether an anomaly occurs in any procedure using only a simple procedure of comparing an order of procedures of a control plane message to be analyzed by the data analyzer 210 or a time taken for each procedure with comparison groups stored in the database 220.

As another example, in a control plane message of a service for a call connection, it is assumed that the control plane message of the MNO "A" includes 5 procedures and the total time taken is 10 seconds and that the control plane message of the MNO "B" includes 4 procedures and the total time taken is 10 seconds. In this case, when an order of the procedures included in the control plane message of the MNO "A" is compared with an order of the procedures included in the control plane message of the MNO "B", the control plane message of the MNO "A" may further include an additional procedure. Therefore, the controller 230 may determine that an anomaly occurs in the additional procedure of the MNO "A". In contrast, when an order of the procedures included in the control plane message of the MNO "B" is compared with an order of the procedures included in the control plane message of the MNO "A", it takes the same time as the 5 procedures in the control plane message of the MNO "A" although the control plane message of the MNO "B" is configured with only the 4 procedures. Thus, the controller 230 may verify that it takes a longer time for one or more procedures of the procedures included in the control plane message of the MNO "B" than a comparison group (e.g., the procedures included in the control plane message of the MNO "A"). Therefore, the controller 230 may determine that an anomaly occurs in the procedure where it takes a longer time than the comparison group.

There may be the following advantages in the above-mentioned determination process of the controller 230. As described above, as there are various services provided to a terminal by an MNO, there may be various anomalies. In a wireless network service or a voice call, there may be various anomalies, such as a timing mismatch which occurs while a backhaul network is changed from fourth generation (4G) or to 3G, an anomaly in synchronization between a terminal and an MNO, and a repeated problem of an unnecessary procedure. The controller 230 may distinguish all types of anomalies by comparing the analyzed result received from the data analyzer 210 with a comparison group stored in the database 220 without the necessity of having a separate procedure for diagnosing an anomaly based on such various types of anomalies.

Meanwhile, the controller 230 may ascertain whether a predetermined procedure is included in a control plane message for a specific service for each MNO, stored in the database 220. In general, a procedure included in a control plane message may include a procedure of requesting a terminal or an MNO to perform specific processing at the MNO or the terminal and transmitting a response to the request. The predetermined procedure may be set to, for example, a procedure where the terminal or the MNO does not respond to a corresponding request or rejects the corresponding request, for example, a procedure where the terminal or the MNO rejects the corresponding request or fails in a response to the corresponding request when a procedure where the MNO requests the terminal to perform specific processing or where the terminal requests the MNO to perform specific processing is included in a control plane message. The controller 230 may ascertain how many such predetermined procedures are included in a control plane message for a specific service for each MNO and may ascertain whether the number of times the corresponding procedure occurs is greater than a reference value. If the number of times the corresponding procedure occurs is greater than the reference value, the controller 230 may determine that an anomaly occurs in a specific service of a specific MNO. For example, it is assumed that 100 control plane messages for the specific service are stored in the database 220 and that the reference value is 10. If a predetermined procedure occurs nine times in a control plane message for a specific service of the MNO "A", the controller 230 may fail to determine that an anomaly occurs in the specific service of the MNO "A". In contrast, if the predetermined procedure occurs 20 times in a control plane message for a specific service of the MNO "B", the controller 230 may determine that an anomaly occurs in the specific service of the MNO "B". The controller 230 may determine whether an anomaly occurs in the specific service in the procedure without comparison for each separate MNO. Herein, the reference value may be set in a different way based on importance of the specific service.

Figure 3:
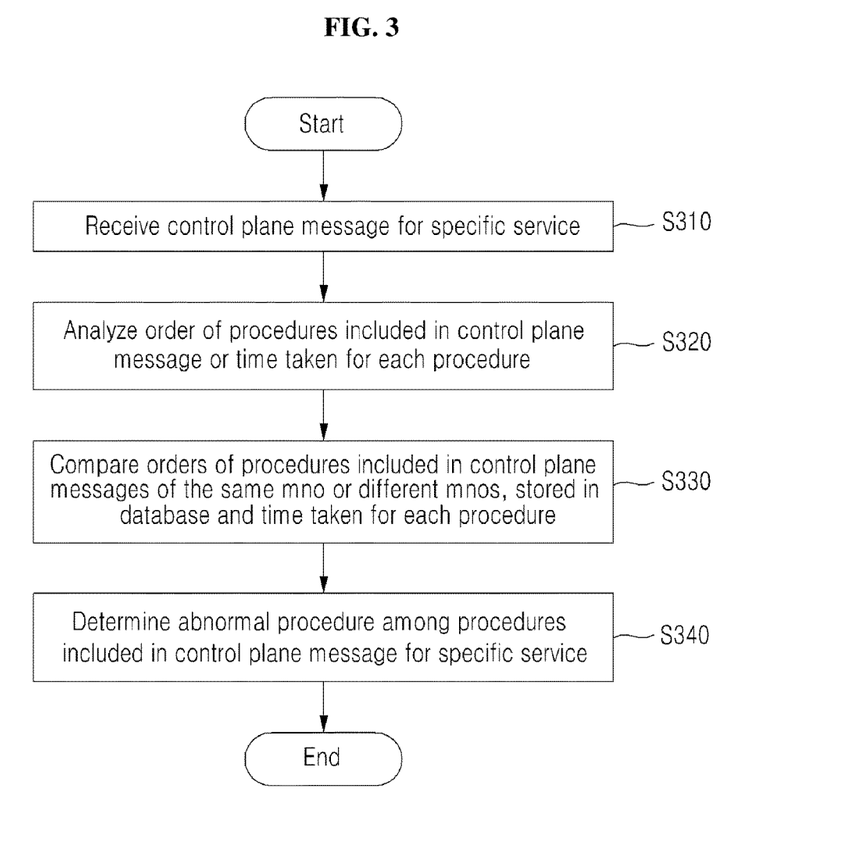
FIG. 3 is a flowchart illustrating an anomaly diagnosis method according to an embodiment.

FIG. 3 is a flowchart illustrating an anomaly diagnosis method according to an embodiment.

In operation S310, a data analyzer 210 of FIG. 2 may receive a control plane message for a specific service. The data analyzer 210 may receive the control plane message for the specific service, received from a specific MNO, from a terminal 110 of FIG. 1.

In operation S320, the data analyzer 210 may analyze an order of procedures included in the control plane message or a time taken for each procedure. The data analyzer 210 may analyze the order of the procedures included in the control plane message to ascertain whether there is any procedure in the control plane message or each of the procedures progresses in any order. Also, the data analyzer 210 may analyzes a time taken for each procedure included in the control plane message to ascertain how long it takes in any procedure.

In operation S330, a controller 230 of FIG. 2 may compare an order of procedures or a time taken for each procedure included in a control plane message of the same MNO or a different MNO. The database 220 may store results of analyzing a plurality of control plane messages provided from different MNOs as well as a predetermined MNO to a terminal before operation S310. The database 220 may receive and store results of analyzing a plurality of control plane messages for various services for each MNO. The results of analyzing the plurality of control plane messages include an order of procedures included in each of the plurality of control plane messages or a time taken for each procedure. The controller 230 may compare the analyzed result for the specific MNO, analyzed in operation S320 by the data analyzer 210, with an analyzed result of the same MNO or a different MNO, stored in the database 220. In detail, the controller 230 may determine whether a procedure estimated to be unnecessarily performed in an order of each of procedures in a control plane message is included in the control plane message or whether there is a procedure where a time taken for each procedure included in the control plane message is particularly long. A detailed description for this will be omitted because it is described with reference to FIG. 2.

In operation S340, the controller 230 may determine an abnormal procedure among the procedures included in the control plane message for the specific service. If there is an unnecessary procedure or a procedure where a time taken is particularly long among procedures included in the control plane message for the specific MNO, analyzed in operation S320 by the data analyzer 210, the controller 230 may determine the corresponding procedure as an abnormal procedure.

Figure 4:
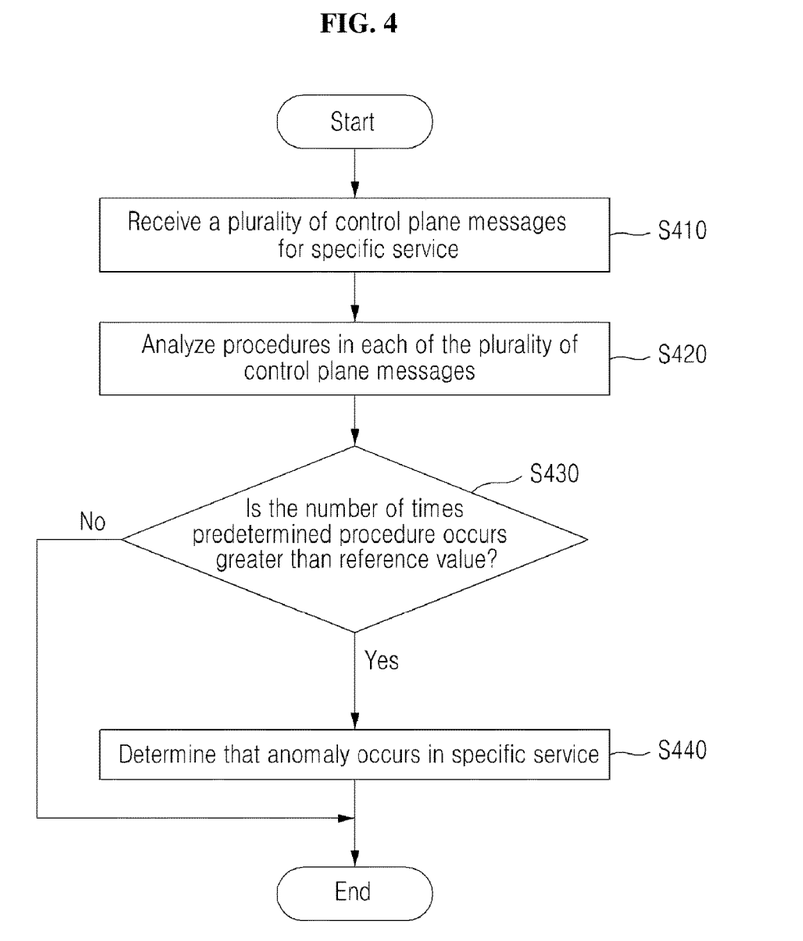
FIG. 4 is a flowchart illustrating an anomaly diagnosis method according to another embodiment.

FIG. 4 is a flowchart illustrating an anomaly diagnosis method according to another embodiment.

In operation S410, a data analyzer 210 of FIG. 2 may receive a plurality of control plane messages for a specific service. The data analyzer 210 may receive the plurality of control plane messages for the specific service from a plurality of different MNOs including a specific MNO.

In operation S420, the data analyzer 210 may analyze procedures included in each of the plurality of control plane messages. The data analyzer 210 may analyze the plurality of received control plane messages for the specific service from the plurality of MNOs. The data analyzer 210 may analyze an order of each of procedures included in each of the plurality of control plane messages or a time taken for each procedure and may store the analyzed result in a database 220 of FIG. 2.

In operation S430, a controller 230 of FIG. 2 may determine whether the number of times a predetermined procedure occurs is greater than a reference value. The controller 230 may verify the results of analyzing the plurality of control plane messages for the specific service for each MNO, stored in the database 220 to determine whether the number of times the predetermined procedure occurs is greater than the reference value. Herein, the predetermined procedure may be set to a procedure where the terminal or the MNO does not respond to a corresponding request or rejects the corresponding request, for example, a procedure where the terminal or the MNO rejects the corresponding request or fails in a response to the corresponding request when a procedure where the MNO requests the terminal to perform specific processing or where the terminal requests the MNO to perform specific processing is included in a control plane message. The controller 230 may determine whether a control plane message including the predetermined procedure is greater than the reference value for each MNO.

In operation S440, if the number of times the predetermined procedure occurs is greater than the reference value, the controller 230 may determine that an anomaly occurs in the specific service. The controller 230 may determine that there is an anomaly in the specific service, which occurs because the predetermined procedure in the control plane message of the specific MNO is greater than the reference value.

Although the operations of each of FIGS. 3 and 4 have been described as being sequentially performed, this is only an exemplary description of the scope and spirit of an embodiment of the inventive concept. In other words, those skilled in the art will appreciate that various modifications, additions, and substitutions are possible, without departing from the characteristics of an embodiment of the inventive concept. For example, the order of the operations shown in each of FIGS. 3 and 4 may be changed, or one or more of the operations may be performed in parallel. Therefore, the inventive concept is not limited to the time-series order as shown in FIGS. 3 and 4.

Meanwhile, the operations shown in FIGS. 3 and 4 may be implemented as a computer-readable code in computer-readable storage media. The computer-readable storage media may include all types of storage devices which store data readable by a computer system. In other words, the computer-readable media may include storage media such as magnetic storage media (e.g., read only memories (ROMs), floppy disks, hard disks, and the like), optical reading media (e.g., compact disc-read only memories (CD-ROMs), digital versatile discs (DVDs), and the like), and carrier waves (e.g., transmission via the Internet). Also, the computer-readable storage media may store and execute computer-readable codes which are distributed to the computer system connected to via a network and are readable by a computer.

As described above, according to an embodiment, the anomaly diagnosis device may quickly and easily ascertain a cause where an anomaly occurs by comparing and analyzing detailed procedures in control plane messages of a plurality of MNOs or statistics for each detailed procedure to diagnose the cause where the anomaly occurs.

The above description is only an exemplary description of the scope and spirit of an embodiment of the inventive concept. Those skilled in the art will appreciate that various modifications, additions, and substitutions are possible, without departing from the characteristics of an embodiment of the inventive concept. Therefore, embodiments of the inventive concept are for illustrative purposes only and do not intend to limit the scope of the inventive concept. The scope of an embodiment of the inventive concept should be interpreted by the claims below, and it should be interpreted that all scopes and spirits within the scope equivalent to the claims below fall with the scope of an embodiment of the inventive concept.

What is claimed is:

1. A network anomaly diagnosis device, comprising:
a data analyzer configured to:
    receive a control plane message from a terminal; and
    analyze an order of procedures included in the control plane message, the control plane message being for a service provided to the terminal by a mobile network operator (MNO);
a database configured to:
    collect results of analyzing a plurality of control plane messages, from the data analyzer, for services provided to the terminal by a plurality of MNOs including the MNO; and
    store the results of analyzing the plurality of control plane messages for the plurality of MNOs; and
a controller configured to compare a result of analyzing the control plane message of the MNO at the data analyzer with the results of analyzing the plurality of control plane messages for the plurality of MNOs, the result of analyzing the control plane message of the MNO at the data analyzer being stored in the database.

2. The network anomaly diagnosis device of claim 1, wherein the data analyzer analyzes a time taken for each of the procedures included in the control plane message.

3. The network anomaly diagnosis device of claim 2, wherein the controller determines whether an anomaly exists in the procedures included in the control plane message of the MNO by at least one of:
    comparing the order of the procedures included in the control plane message of the MNO with an order of procedures included in at least one of the plurality of control plane messages of the plurality of MNOs, the order of procedures included in the plurality of control plane messages being stored in the database, or comparing the time taken for each of the procedures included in the control plane message of the MNO with a time taken for each procedure included in the at least one of the plurality of control plane messages of the plurality of MNOs, the time taken for each procedure included in the plurality of control plane messages being stored in the database.

* * * * *